United States Patent
Kinoshita

(10) Patent No.: US 10,627,903 B2
(45) Date of Patent: Apr. 21, 2020

(54) TACTILE SENSATION PROVIDING APPARATUS AND METHOD FOR PROVIDING TACTILE SENSATION

(75) Inventor: Kenta Kinoshita, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/575,592

(22) PCT Filed: Jan. 21, 2011

(86) PCT No.: PCT/JP2011/000332
§ 371 (c)(1),
(2), (4) Date: Jul. 26, 2012

(87) PCT Pub. No.: WO2011/093045
PCT Pub. Date: Aug. 4, 2011

(65) Prior Publication Data
US 2012/0299859 A1 Nov. 29, 2012

(30) Foreign Application Priority Data
Jan. 27, 2010 (JP) .................................. 2010-015980

(51) Int. Cl.
*G06F 3/01* (2006.01)
*G06F 3/041* (2006.01)
*G06F 3/0488* (2013.01)

(52) U.S. Cl.
CPC ............ *G06F 3/016* (2013.01); *G06F 3/0414* (2013.01); *G06F 3/04886* (2013.01); *G06F 2203/014* (2013.01)

(58) Field of Classification Search
None
See application file for complete search history.

(56) References Cited

U.S. PATENT DOCUMENTS 7,593,000 B1* 9/2009 Chin .............................. 345/156
8,065,624 B2 11/2011 Morin et al.
(Continued)

FOREIGN PATENT DOCUMENTS

CN 101517514 A 8/2009
CN 101544232 A 9/2009
(Continued)

OTHER PUBLICATIONS

An Office Action; "Notice of Reason for Rejection," issued by the Japanese Patent Office dated Oct. 1, 2013, which corresponds to Japanese Patent Application No. 2010-015980 and is related to U.S. Appl. No. 13/575,592; with concise English language explanation.
(Continued)

Primary Examiner — Stephen T. Reed
(74) Attorney, Agent, or Firm — Studebaker & Brackett PC

(57) ABSTRACT

A tactile sensation providing apparatus and a method for the same utilize an existing application configuring a user interface, and provide tactile sensation in response to an input so as to improve an operation feeling. The tactile sensation providing apparatus includes a touch sensor, a tactile sensation providing unit which vibrates a touch face, a display unit, a memory unit which stores a definition file of a user interface including information about a tactile sensation to be provided corresponding to an object included in the user interface, and a control unit which sets the user interface defined in the definition file by analyzing the definition file and, when an input to the object for executing a predetermined operation detected, controls the tactile sensation providing unit to provide the tactile sensation corresponding to the object to a pressing object.

4 Claims, 12 Drawing Sheets

(56) References Cited

U.S. PATENT DOCUMENTS

| | | | |
|---|---|---|---|
| 8,157,650 B2 | 4/2012 | Grant et al. | |
| 8,378,979 B2* | 2/2013 | Frid et al. | 345/173 |
| 8,721,416 B2 | 5/2014 | Grant et al. | |
| 8,884,884 B2* | 11/2014 | Cruz-Hernandez et al. | |
| | | | 345/173 |
| 2003/0189552 A1 | 10/2003 | Chuang et al. | |
| 2007/0035523 A1* | 2/2007 | Cohen | G06F 9/4443 |
| | | | 345/169 |
| 2008/0064499 A1 | 3/2008 | Grant et al. | |
| 2008/0150911 A1 | 6/2008 | Harrison | |
| 2009/0244017 A1 | 10/2009 | Pala et al. | |
| 2009/0262091 A1 | 10/2009 | Ikeda et al. | |
| 2010/0271326 A1 | 10/2010 | Hu et al. | |
| 2011/0043454 A1* | 2/2011 | Modarres et al. | 345/173 |
| 2012/0196664 A1 | 8/2012 | Grant et al. | |
| 2012/0313879 A1 | 12/2012 | Harrison | |

FOREIGN PATENT DOCUMENTS

| | | |
|---|---|---|
| CN | 101620510 A | 1/2010 |
| JP | 2001-296941 A | 10/2001 |
| JP | 2003-288158 A | 10/2003 |
| JP | 2008-130055 A | 6/2008 |
| JP | 2009-241924 A | 10/2009 |
| JP | 2010-015239 A | 1/2010 |
| TW | I234115 B | 6/2005 |
| TW | 200941312 A | 10/2009 |
| TW | 201039209 A | 11/2010 |
| WO | 2011/093045 A1 | 8/2001 |
| WO | 2009/006221 A1 | 1/2009 |

OTHER PUBLICATIONS

International Search Report; PCT/JP2011/000332; dated Mar. 8, 2011.

An Office Action; "Notice of Reason for Rejection," issued by the Japanese Patent Office dated Mar. 4, 2014, which corresponds to Japanese Patent Application No. 2010-015980 and is related to U.S. Appl. No. 13/575,592; with English language concise explanation.

An Office Action issued by the Taiwanese Patent Office dated Jan. 28, 2014, which corresponds to Taiwanese Patent Application No. 100109148 and is related to U.S. Appl. No. 13/575,592; with English language concise explanation.

An Office Action; "Notification of the first Office Action," issued by the State Intellectual Property Office of China dated Jul. 28, 2014, which corresponds to Chinese Patent Application No. 201180007610.9 and is related to U.S. Appl. No. 13/575,592; with English language translation.

The Second Office Action issued by the State Intellectual Property Office of China dated Mar. 18, 2015, which corresponds to Chinese Patent Application No. 201180007610.9 and is related to U.S. Appl. No. 13/575,592; with English language translation.

* cited by examiner

FIG. 2
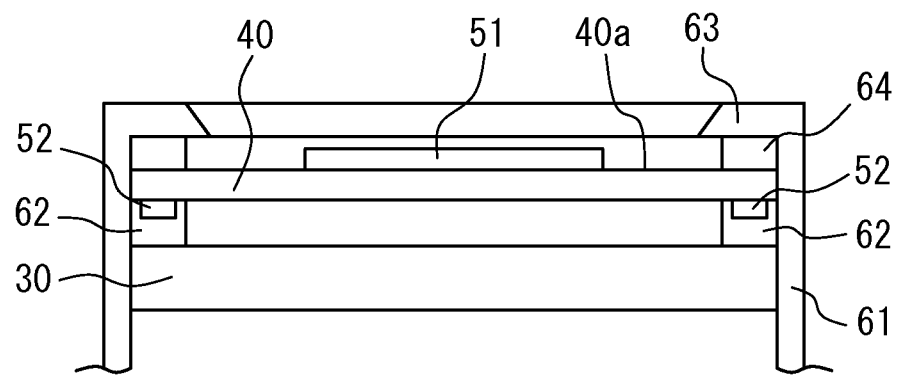
(A)
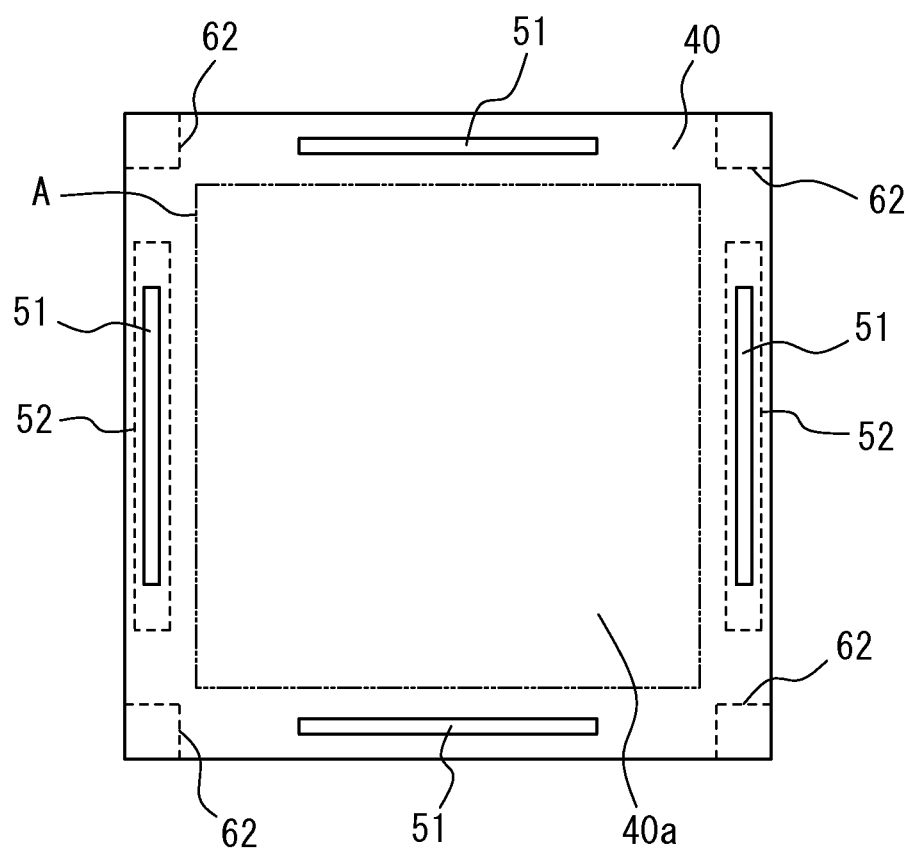
(B)

FIG. 5

| TYPE OF OBJECT \ OPERATION (TACTILE SENSATION) | h:pressed (CLICK SENSATION) | h:released (RELEASE SENSATION) | h:slided (SLIDING SENSATION) |
|---|---|---|---|
| HapButton1 (BUTTON1) — (POWER) | Type_C1 (JELLY-LIKE) | Type_R1 (CLICK) | Type_S2 (ROUGH) |
| HapButton2 (BUTTON2) — (REWIND/FAST-FORWARD) | Type_C2 (CLICK) | Type_R1 (CLICK) | Type_S1 (SLEEK) |
| HapTextBox (TEXT BOX/NO TEXT) | Type_C3 (BEEP) | | Type_S1 (SLEEK) |
| HapTextBox (TEXT BOX/WITH TEXT) — PLAY CHAPTER 1  3'58 | Type_C3 (BEEP) | | Type_S2 (ROUGH) |

```
<structure>
<part class="HapButton1" id="button1">
</structure>                                              (1)
<style>
<property part-name="button1" name="g:location">230,40</property>
<property part-name="button1" name="g:size">60,60</property>
<property part-name="button1" name="image_id">button.jpg</property>
</style>

<behavior>
<rule>
<condition>
<op name="and">
<event class="HapticListner.h:pressed"/>
<op name="equal">
<property part-name="button1" event-class="HapticListner.h:pressed" name="pressValue"
/>
<constant value="1.5N"/>
</op>                                                     (2)
</op>
</condition>
<action>
<property part-name="button1" name="Hap:Button">
    <call name="Hapbutton1" effect="Type_C1">
</property>                                               (3)
<property part-name="button1" name="image_id">button_change.jpg</property>
</action>
<condition>
<event class="HapticListner.h:slided"/>
<op name="equal">
<property part-name="button1" event-class="HapticListner.h:slided" name="pressValue" />
<constant value="1.5N"/>
</op>
</op>
</condition>
<action>
<property part-name="button1" name="Hap:Button">
    <call name="Hapbutton1" effect="Type_S2">
</property>                                               (4)
<property part-name="button1" name="image_id">button_change.jpg</property>
</action>
</rule>
</behavior>
```

FIG. 6

TACTILE SENSATION PROVIDING APPARATUS AND METHOD FOR PROVIDING TACTILE SENSATION

CROSS REFERENCE TO RELATED APPLICATION

This application claims priority to and the benefit of Japanese Patent Application No. 2010-15980 filed on Jan. 27, 2010, the entire contents of which are incorporated herein by reference.

TECHNICAL FIELD

The present invention relates to an apparatus for providing a tactile sensation based on a pressing operation to a touch sensor and a method for providing the tactile sensation by the apparatus.

BACKGROUND ART

In recent years, there are mobile terminals such as mobile phones and gaming machines that employ input apparatuses having touch sensors such as touch panels, touch switches or the like as input apparatuses such as operation units, switches or the like for detecting contact operations by users. Such input apparatuses having touch sensors are popularly used for, in addition to the mobile terminals, information equipments such as calculators and ticket vending machines, home electric appliances such as microwaves, TV sets and lighting equipments, industrial equipments (FA equipments) and the like.

There are known a variety of types of those touch sensors, such as a resistive film type, a capacitive type, an optical type and the like. However, touch sensors of these types receive a contact operation by a finger or a stylus pen and, unlike push-button switches, the touch sensors themselves are not physically displaced when being touched.

Therefore, an operator is not able to obtain feedback to the contact operation to the touch sensor. Without an operation feeling in contact operation, the operator has no means of knowing whether the contact operation is appropriately detected by the terminal. In using such a terminal, accordingly, the operator is likely to repeat the contact operation at the same position, which may cause stress on the operator.

In order to prevent such unnecessary repeated contact operations, there is known an apparatus which, for example, generates sound when the terminal appropriately recognizes the contact operation. There is also known an apparatus which changes a display state by, for example, changing color of an input object of a user interface (hereinafter, referred to simply as an "object") such as an input button graphically depicted in a display unit at a position corresponding to a position where the contact operation is detected. These apparatuses allow the operator auditory or visual confirmation on whether the contact operation is appropriately detected by the terminal.

However, such auditory feedback may be difficult to be confirmed in a noisy environment and is not applicable when the equipment being used is in a silent mode. Moreover, in using such visual feedback, if the object displayed on the display unit is small, the operator may not be able to confirm the change in the display state, as a view of the object is blocked by the finger, particularly when the operator performs the contact operation with the finger.

As such, there is suggested a feedback method relying on neither auditory-nor visual sensation but instead vibrating the touch sensor when the touch sensor detects a contact (for example, see Patent Documents 1, 2).

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

The apparatuses disclosed in the above Patent Documents 1 and 2 are able to provide the tactile sensation at an operator's fingertip by vibration when the contact to the touch sensor is detected. Therefore, in using such an apparatus, the operator may recognize, through the tactile sensation, that the contact operation to the touch sensor is appropriately detected by the apparatus.

In order to provide the tactile sensation when the contact is detected, however, such a tactile sensation providing apparatus needs an operation to provide the tactile sensation under a predetermined condition to be preliminarily incorporated into application software (hereinafter, referred to simply as "application"). That is, the above apparatuses may provide the tactile sensation under the predetermined condition by using an application developed to generate vibration. However, when using an application that does not support generation of vibration as it stands, the above apparatus may not appropriately provide the tactile sensation.

Accordingly, in order to appropriately provide the tactile sensation under the predetermined condition by the apparatus described above, it is necessary to develop a new application or to modify an existing application by adding the operation to provide the tactile sensation or the like.

For example, it is necessary to add, to the application, an operation to provide a predetermined tactile sensation upon detection of a contact to the touch sensor at a position corresponding to the object such as a key or a button graphically depicted in the display unit of the tactile sensation providing apparatus. It is also necessary to prevent the tactile sensation providing apparatus from providing the tactile sensation when detecting a contact to the touch sensor elsewhere than the position of the object such as the key or the button graphically depicted in the display unit.

By controlling provision of the tactile sensation as described above, the tactile sensation providing apparatus, when detecting the contact via the user interface employing the touch sensor and GUI (Graphical User Interface), may provide the tactile sensation by vibration at the operator's fingertip and the like. That is, the tactile sensation providing apparatus, by providing the tactile sensation, may notify the operator of that the contact by the operator to the object such as the key or the button graphically depicted is detected. Also, the tactile sensation providing apparatus may avoid providing feedback when the contact is detected elsewhere than the position of the object such as the key or the button graphically depicted.

For such a control, the tactile sensation providing apparatus generally needs to corporate with an application which manages a state of the GUI when there is the contact to the touch sensor, that is, a state of the object such as the key or the button displayed on the display unit.

The following is a description of an operation of an assumed tactile sensation providing apparatus for providing the tactile sensation.

FIG. 11 is a block diagram illustrating a schematic configuration of an assumed tactile sensation providing apparatus. As illustrated in FIG. 11, a tactile sensation providing apparatus 100 includes a control unit 110, an application execution unit 120, a display unit 130, a touch sensor 140, a tactile sensation providing unit 150 and a memory unit 160. The control unit 110 includes a display control unit 112 and a tactile sensation control unit 114. The memory unit 160 includes an application storage area 162.

The control unit 110 controls an overall tactile sensation providing apparatus 100 including each function unit. The application execution unit 120 retrieves a variety of applications from the application storage area 162 of the memory unit 160 and executes operations based on the applications. In the following description, it is assumed that the application executed by the application execution unit 120 preliminarily includes (incorporates) the operation to provide the predetermined tactile sensation when the touch sensor 140 detects the contact at the position corresponding to the object displayed on the display unit 130.

The display unit 130 is constituted by using a liquid crystal display, an organic EL display or the like and displays the object of the key or the button graphically depicted for suggesting the operator a position to contact. The touch sensor 140 is usually disposed on a front face of the display unit 130 to detect the contact operation by the operator's finger or the like on the touch face of the touch sensor 140 corresponding to a position of the object displayed on the display unit 130. Also, the touch sensor 140 notifies the application execution unit 120 via the control unit 110 of the contact position detected on the touch face. The tactile sensation providing unit 150 is constituted by using a small eccentric motor, a piezoelectric element or the like and, by vibrating the touch face of the touch sensor 140, provides the tactile sensation to a contact object such as the operator's finger or the like performing the contact operation.

The display control unit 112 of the control unit 110, based on display data supplied from the application execution unit 120, controls a display to display images of the object and the like on the display unit 130 and also to change the display state of the image. The tactile sensation control unit 114, based on an instruction of the application execution unit 120, controls the tactile sensation providing unit 150 to provide vibration in a vibration pattern under the predetermined condition.

FIG. 12 is a flowchart schematically illustrating an example of the operation to provide the tactile sensation based on detection of the contact by the tactile sensation providing apparatus 100.

At a point when the contact to the touch face of the touch sensor 140 is detected, the tactile sensation providing apparatus 100 starts an operation to control provision of the tactile sensation. When this operation is started, first, the touch sensor 140 notifies the application execution unit 120 of the contact position on the touch face (step S100). Upon being notified of the contact position, the application execution unit 120 determines whether the contact position corresponds to an image of the object such as the key or the button on the display unit 130 (step S102). At step S102, when the contact position does not correspond to the image of the object such as the key or the button on the display unit 130, the application execution unit 120 ends the operation without issuing instructions related to the display and the tactile sensation. In this case, the tactile sensation is not provided.

On the other hand, when the contact position corresponds to the image of the object such as the key or the button, the application execution unit 120 supplies the display control unit 112 with the display data for displaying a notification that an input is detected. Here, the notification that the input is detected is a display allowing a visual confirmation of the operator by, for example, momentarily highlighting the object such as the key or the button or displaying depression of the key or the button. Upon receiving the display data from the application execution unit 120, the display control unit 112 changes the image on the display unit 130 based on the display data (step S104).

Subsequently, in order to notify the operator of that the input is detected, the application execution unit 120 instructs the tactile sensation control unit 114 to provide the predetermined tactile sensation. Here, the predetermined tactile sensation is feedback such as a momentary vibration of the touch face of the touch sensor 140 that may be perceived by the operator through the sense of touch. Upon receiving the instruction to provide the tactile sensation as described above, the tactile sensation control unit 114 controls the tactile sensation providing unit 150 to provide the vibration in a predetermined vibration pattern based on the instruction. Thereby, the tactile sensation providing unit 150 provides the tactile sensation by the vibration in the predetermined vibration pattern to the contact object contacting the touch face of the touch sensor 140 (step S106). Thereby, the tactile sensation providing apparatus 100, through the user interface employing the touch sensor and the GUI, may provide the tactile sensation only when detecting the input to the object suggesting a position to contact to the operator.

According to the tactile sensation providing apparatus 100, as described above, there is no problem in performing the above operation when the application supports the operation to provide the tactile sensation. That is, in using the application preliminarily incorporating the operation to provide the tactile sensation therein, the predetermined tactile sensation may be appropriately provided by the above operation.

However, in using an application that does not support the operation to provide the tactile sensation as it stands, the tactile sensation providing apparatus 100 may not appropriately provide the tactile sensation when a display of the object is changed based on the contact operation. Accordingly, to the end that the tactile sensation providing apparatus 100 utilizes various application resources that have been developed to date, each application needs to be modified to include the operation to provide the tactile sensation under the predetermined condition. Since such modification to add the operation needs to be performed to each of the various applications, enormous work and cost are anticipated. Moreover, to the end that each object provides a different tactile sensation, it is necessary to add an operation to provide the different tactile sensation to respective objects, which greatly increases work and cost.

Under such a circumstance, it is anticipated that, in the future, vendors may be prevented from developing the applications for the tactile sensation providing apparatus and a spread of platforms employing the touch sensor and the GUI may be delayed.

The techniques disclosed in the above Patent Documents 1 and 2, however, merely vibrate the touch sensor in response to the contact when the touch sensor detects the contact. Therefore, when the application supporting provision of the tactile sensation is applied to the apparatuses disclosed in the Patent Documents 1 and 2, the apparatuses may not appropriately provide the tactile sensation as necessary by using the application as it stands. Especially in using the apparatus having a button switch such as a mechanical push-button switch (push-type button switch) graphically depicted on the touch sensor, the tactile sensation is provided when the finger or the like lightly contacts (touches) the touch sensor. Since the apparatus responds to such a light contact prior to the pressing (pushing) operation to the touch sensor by the operator and provides a response different from that of the depicted image (push button), an erroneous operation may be triggered.

Moreover, since the apparatuses according to the above patent documents, when the operator does not intend to push (that is, the operator does not apply a force on) the graphically depicted button switch, provide the tactile sensation in response to the light touch (contact) before the touch sensor is pushed, the operator has a feeling of strangeness. For example, the touch sensor of the resistive film type provides the tactile sensation when an upper conductive film is contacted to a lower conductive film, and the touch sensor of the capacitive type provides the tactile sensation when an electric signal by the contact is detected.

Further, a conventional tactile sensation providing apparatus, when employing the user interface based on the application preliminarily incorporating the operation to provide the tactile sensation by the touch sensor, may not provide an operation feeling of the mechanical push-button switch when the input is detected. That is, the tactile sensation provided by the conventional tactile sensation providing apparatus merely notifies the operator of that the contact is detected by simply vibrating a body. Accordingly, the tactile sensation provided by the conventional tactile sensation providing apparatus does not provide the operator with a realistic operation feeling similar to that obtained when operating the mechanical push-button switch.

However, the user interface employing the touch sensor and the GUI often displays the object of the graphically depicted mechanical push-button switch. Therefore, when an input to such an object is detected, it is preferable to provide the realistic tactile sensation similar to that of the mechanical push-button switch, from a point of view of the operation feeling of the operator. Providing feedback obtained when clicking an actual key or button upon detection of the input to the displayed object may improve the operation feeling of the operator.

In operating the mechanical push-button switch, the operator applies a certain pressure force on the switch, thereby the switch is pressed down and provides a tactile sensation of depression (hereinafter, referred to as a click sensation) of a metal dome switch, for example. In operating the mechanical push-button switch, also, the operator reduces the pressure force in the course of releasing the switch being pressed down, thereby the operator may obtain a tactile sensation (hereinafter, referred to as a release sensation) of the metal dome switch or the like being restored to its original non-pressed state. Further, when the operator touches (contacts) the mechanical push-button switch very lightly, the click sensation is not provided, and thus the release sensation is not provided, either. The conventional tactile sensation providing apparatus employing the touch sensor and the GUI is not able to provide the click sensation and the release sensation of the mechanical push-button switch described above.

Also, when the mechanical push-button switch is pressed down, a variety of tactile sensations may be obtained based on a different physical structure of a switch mechanism and the like. For example, an intensity of the tactile sensation obtained in pressing may be different based on a size of the button, or different tactile sensations may be obtained based on an intensity of a stroke to press the button. The conventional apparatuses for providing the tactile sensation are not able to provide the tactile sensation different with each object, that is, tactile sensations suitable for each object. In order to substantialize such different tactile sensations, it is necessary, as described above, to modify the application by adding the operation for providing the tactile sensation different with each object, which requires enormous work and cost.

Accordingly, an object of the present invention in consideration of the above problems is to provide a tactile sensation providing apparatus which, by utilizing the existing application configuring the user interface, provides the tactile sensation in response to the input and thereby improves the operation feeling of the operator, and a method for providing the tactile sensation by the tactile sensation providing apparatus.

Solution to Problem

In order to achieve the above object, a tactile sensation providing apparatus according to a first aspect of the present invention includes:

a touch sensor;

a tactile sensation providing unit configured to vibrate a touch face of the touch sensor;

a display unit;

a memory unit configured to store a definition file of a user interface displayed on the display unit including information about a tactile sensation to be provided by the tactile sensation providing unit correspondingly to user interface objects included in the user interface; and a control unit configured to set the user interface defined in the definition file by analyzing the definition file and, when an input to the user interface object for executing a predetermined operation is detected, to control the tactile sensation providing unit such that the tactile sensation corresponding to the user interface object is provided to a pressing object pressing the touch face.

A second aspect of the present invention is the tactile sensation providing apparatus according to the first aspect, further including a load detection unit configured to detect a pressure load on the touch face of the touch sensor, wherein the control unit, when the load detection unit detects the pressure load satisfying a standard load for providing the tactile sensation while the input to the user interface object for executing the predetermined operation is detected, controls the tactile sensation providing unit such that the tactile sensation is provided to the pressing object.

In order to achieve the above object, a tactile sensation providing apparatus according to a third aspect of the present invention includes:

application software configured, when activated, to supply identification information of a user interface definition file defining a tactile sensation; and a control unit configured to retrieve the user interface definition file from a memory unit based on the identification information supplied from the application software and to set the tactile sensation for the user interface according to the user interface definition file.

In order to achieve the above object, a tactile sensation providing apparatus according to a fourth aspect of the present invention includes:

application software, when activated, configured to supply an interface definition file defining a tactile sensation; and a control unit configured to store the user interface definition file supplied from the application software in a memory unit and to set the tactile sensation for the user interface according to the user interface definition file retrieved from the memory unit.

In order to achieve the above object, a method for providing a tactile sensation according to a fifth aspect of the present invention includes steps of:

receiving identification information of a user interface definition file defining the tactile sensation from activated application software;

retrieving the user interface definition file from a memory unit based on the identification information; and setting the tactile sensation for a user interface according to the user interface definition file.

In order to achieve the above object, a method for providing a tactile sensation according to a sixth aspect of the present invention includes steps of:

receiving a user interface definition file defining a tactile sensation from activated application software;

storing the user interface definition file in a memory unit; and setting the tactile sensation for a user interface according to the user interface definition file retrieved from the memory unit.

Effect of the Invention

According to the present invention, by using an application that does not preliminarily support an operation to provide the tactile sensation in response to an input, an appropriate tactile sensation corresponding to each object may be provided under a predetermined condition. Therefore, the present invention enables to utilize an existing application and to provide a user interface with excellent operability by using such an application. According to the present invention, further, when a pressing operation to the touch sensor is detected, a tactile sensation similar to that of mechanical push-button switches may be provided. Therefore, the present invention may improve an operation feeling of an operator.

BRIEF DESCRIPTION OF DRAWINGS

FIG. 2 is a diagram illustrating an exemplary implementation structure of the tactile sensation providing apparatus illustrated in FIG. 1;

FIG. 5 is a diagram illustrating an example of setting of tactile sensations to be provided in response to operations to respective objects of the user interface used by the tactile sensation providing apparatus illustrated in FIG. 1;

FIG. 6 is a diagram illustrating an example of the user interface definition file used in the embodiment of the present invention;

DESCRIPTION OF EMBODIMENT

An embodiment of the present invention will be described with reference to the accompanying drawings.

According to the present invention, a definition file of a user interface displayed on the display unit defines a tactile sensation to be provided when an input to each object of the user interface is detected. According to the present invention, also, the tactile sensation is provided not in response to a light contact (touch) to a touch sensor but to a pressing (pushing) operation to the touch sensor intended by an operator.

Figure 1:
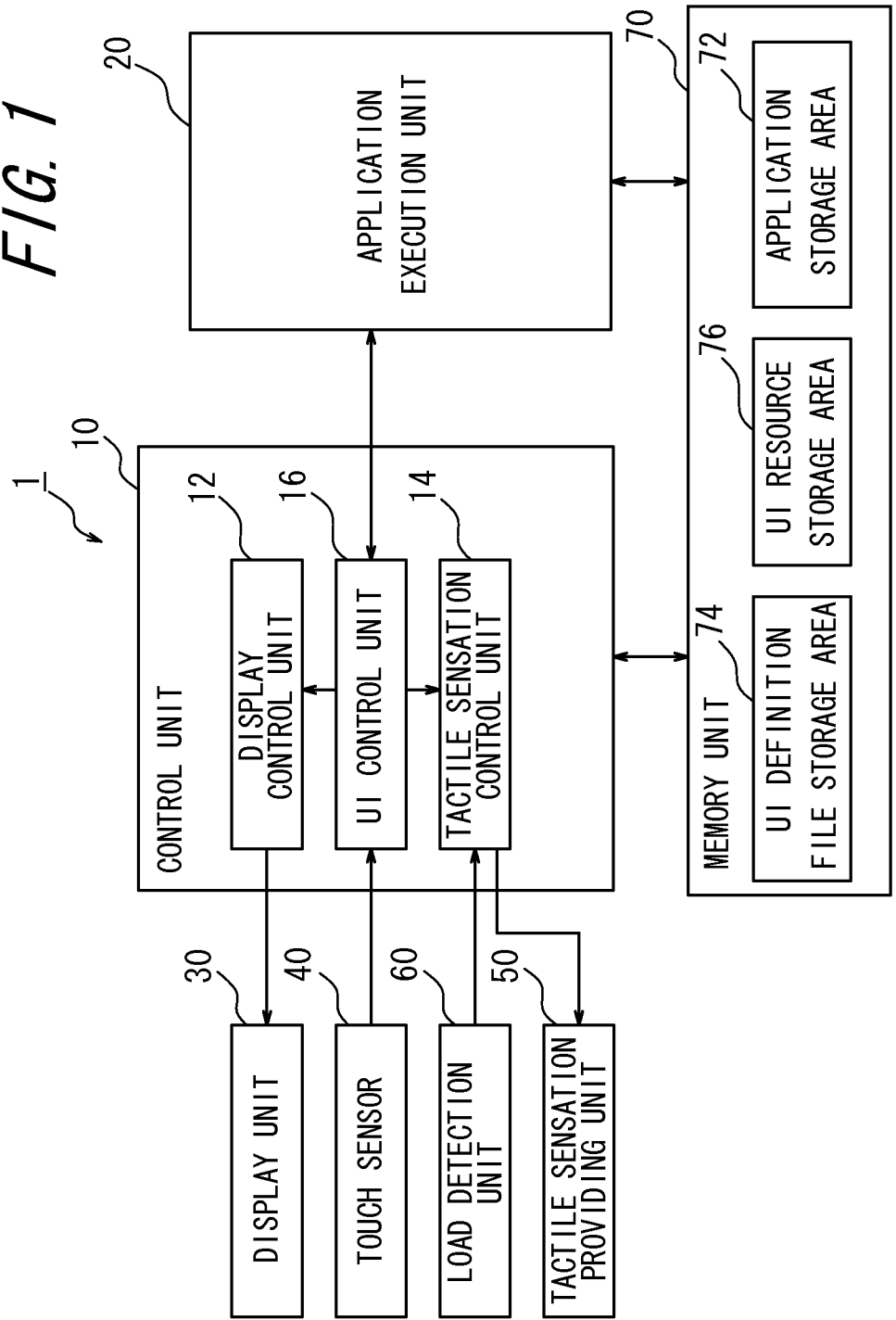
FIG. 1 is a block diagram illustrating a schematic configuration of a tactile sensation providing apparatus according to an embodiment of the present invention.

FIG. 1 is a block diagram illustrating a schematic configuration of a tactile sensation providing apparatus according to the embodiment of the present invention.

As illustrated in FIG. 1, a tactile sensation providing apparatus 1 includes a control unit 10, an application execution unit 20, a display unit 30, a touch sensor 40, a tactile sensation providing unit 50, a load detection unit 60 and a memory unit 70. The control unit 10 includes a display control unit 12, a tactile sensation control unit 14 and a user interface control unit 16. The memory unit 70 includes an application storage area 72, a user interface definition file storage area 74 and a user interface resource storage area 76. Note that the "user interface" will be abbreviated to a "UI" in the figures and the following description.

The control unit 10 controls an overall tactile sensation providing apparatus 1 including each function unit. The application execution unit 20 retrieves a variety of applications from the application storage area 72 of the memory unit 70 and executes operations based on the applications. According to the present embodiment, the application execution unit 20 executes an application that does not originally support provision of a tactile sensation.

The display unit 30 displays an object of a graphically depicted push-button switch (push-type button switch). The push-button switch is a mechanical key like an input button or a key (hereinafter, referred to simply as a "key or the like") that may be actually pressed down. According to the present embodiment, the display unit 30 displays the object of the graphically depicted push-button switch. The display unit 30 may be constituted by using, for example, a liquid crystal display panel, an organic EL display panel and the like.

The touch sensor 40 is usually disposed on a front face of the display unit 30 to detect a pressing operation (contact) to the object displayed on the display unit 30 by an operator's finger or the like (a pressing object) at a corresponding position on the touch face of the touch sensor 40. Upon detection of the contact to the touch face, the touch sensor 40 notifies the application execution unit 20 of a detected contact position via the input control unit 16. The touch sensor 40 may include a known type such as a resistive film type, a capacitive type and an optical type.

The tactile sensation providing unit 50 is constituted by using a piezoelectric vibrator or the like and vibrates the touch face of the touch sensor 40. By generating a vibration on the touch face of the touch sensor 40, the tactile sensation providing unit 50 provides the tactile sensation to the pressing object pressing the touch face. The pressing object pressing the touch face is, for example, the operator's finger or a stylus pen. The load detection unit 60 detects a pressure load on the touch face of the touch sensor 40 and may include an element such as, for example, a strain gauge sensor, a piezoelectric element or the like, which linearly reacts to a load. Also, the load detection unit 60 notifies the tactile sensation control unit 14 of the detected pressure load on the touch face of the touch sensor 40.

The display control unit 12 of the control unit 10, based on display data supplied from the application execution unit 20 via the UI control unit 16, controls a display such as to display an image of the object on the display unit 30 or to change the image. The tactile sensation control unit 14, when the pressure load detected by the load detection unit 60 satisfies a standard load for providing the tactile sensation while the tactile sensation control unit 14 is detecting an input to the object for executing a predetermined operation, controls the tactile sensation providing unit 50 to generate a vibration in a predetermined pattern under a predetermined condition.

The UI control unit 16 notifies the application execution unit 20 of information about the contact position on the touch sensor 40. The UI control unit 16 also, when the contact position on the touch sensor 40 corresponds to an object for starting the predetermined operation, receives the display data of the object for indicating that the input is detected from the application execution unit 20. Further, the UI control unit 16, when the contact position on the touch sensor 40 corresponds to the object for starting the predetermined operation and the UI definition file defines a tactile sensation corresponding to the object, sets the tactile sensation to be provided for the tactile sensation control unit 14 according to the definition.

The application storage area 72 of the memory unit 70 stores a variety of applications including data of procedures to implement various functions. The UI definition file storage area 74 stores the UI definition file defining a sequence of generation rules of the entire UI. The UI resource storage area 76 stores UI resources such as image data, font data and text data used for generating the UI. When the UI is actually generated, the image data and the text data stored in the UI resource storage area 76 are displayed on the display unit 30.

FIG. 2 illustrates an exemplary implementation structure of the tactile sensation providing apparatus 1 illustrated in FIG. 1; FIG. 2(A) is a cross-sectional view of a main section, and FIG. 2(B) is a plane view of the main section. The display unit 30 is contained in a housing 61. The touch sensor 40 is disposed on the display unit 30 via insulators 62 made of elastic members. In the tactile sensation providing apparatus 1 according to the present embodiment, the display unit 30 and the touch sensor 40 are rectangular in shape in a planar view. Also, in the tactile sensation providing apparatus 1, the touch sensor 40 is held on the display unit 30 via the insulators 62 arranged at four corners outside a display area A of the display unit 30 indicated by a chain double-dashed line in FIG. 2(B).

In addition, the housing 61 is provided with an upper cover 63 covering a surface area of the touch sensor 40 outside the display area of the display unit 30. An insulator 64 made of elastic member is arranged between the upper cover 63 and the touch sensor 40. The touch sensor 40 illustrated in FIG. 2 may have, for example, a surface member having a touch face 40a and constituted by using a transparent film or the glass, and a rear face member made of the glass or acryl. The touch sensor 40 is designed such that, when the touch face 40a is pressed down, a pushed part is slightly bent (strained) relative to a pressing force or a structure itself is bent slightly.

A strain gauge sensor 51 to detect a load (the pressuring force) applied on the touch sensor 40 is provided, adhered or the like, on a surface of the touch sensor 40 at a position close to each side to be covered by the upper cover 63. Also, a piezoelectric vibrator 52 to vibrate the touch sensor 40 is provided, adhered or the like, on the rear face of the touch sensor 40 at a position close to an edge of each of two opposing sides. That is, the tactile sensation providing apparatus 1 illustrated in FIG. 2 has the load detection unit 60 illustrated in FIG. 1 including four strain gauge sensors 51 and the tactile sensation providing unit 50 including two piezoelectric vibrators 52. The tactile sensation providing unit 50 vibrates the touch sensor 40 such that the touch face 40a is vibrated. It is to be noted that the housing 61, the upper cover 63 and the insulator 64 illustrated in FIG. 2(A) are omitted in FIG. 2(B).

Next, the UI definition file stored in the UI definition file storage area 74 will be described.

The UI definition file storage area 74 of the memory unit 70 stores the UI definition file that defines a specification and an operation of the UI necessary for executing each application stored in the application storage area 72. In using the UI, either the same UI or different UIs may be used for different applications. Here, for convenience sake, the UI definition file storage area 74 stores the UI definition files corresponding to the respective applications.

For example, when the tactile sensation providing apparatus 1 is used as an input apparatus of a mobile phone, a mobile phone operation input UI definition file, corresponding to the application configuring a UI used in input operation to the mobile phone by the operator, is stored in the UI definition file memory unit 74. Similarly, for example, when the tactile sensation providing apparatus 1 is used as an input apparatus of an ATM (Automated Teller Machine) of a bank, an ATM operation input UI definition file, corresponding to the application configuring a UI used in input operation to the ATM, is stored in the UI definition file memory unit 74.

According to the present embodiment, a language according to a UIML (User Interface Markup Language) form based on XML is used as an example of a language to describe the UI definition file. Like the UIML, a UI based on XML (Extensible Markup Language) has been recently introduced. Describing the UI by using an XML file having a standardized description method facilitates reuse of program codes and enables to port the UI to another model. Accordingly, the same UI may be used for terminals of different models produced by different manufactures, for example, by using the UI alone independently from each terminal.

Typical examples of such an XML-based UI are UI Foundation developed by TAT (http://www.tat.se/), VIVID UI developed by Acrodea, Inc. (http://www.acrodea.co.jp/), UI One developed by Qualcomm Incorporated (http://www.qualcomm.co.jp/) and the like.

Figure 3:
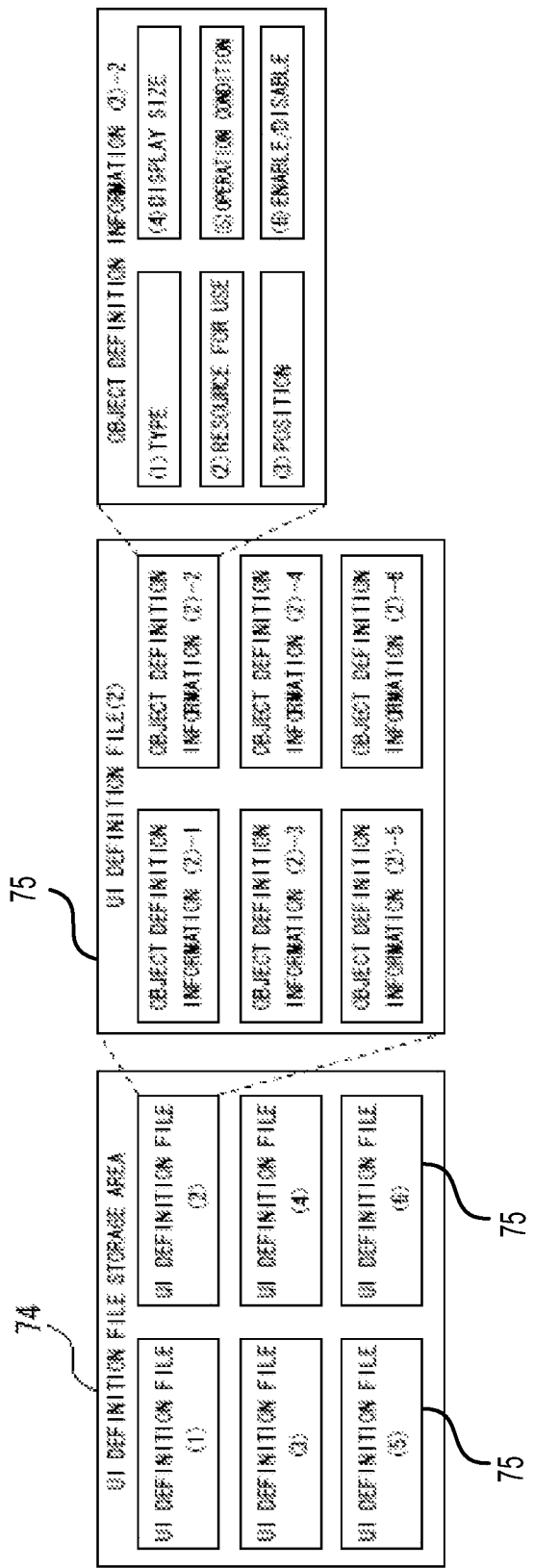
FIG. 3 is a conceptual diagram illustrating contents of a user interface definition file of the present invention.

FIG. 3 is a conceptual diagram illustrating contents of the UI definition file 75. As illustrated in FIG. 3, the UI definition file storage area 74 of the memory unit 70 of the tactile sensation providing apparatus 1 stores the UI definition files 75 defining a sequence of rules used in generating an entire UI. Although six UI definition files (1) to (6) are stored in FIG. 3, the UI definition file storage area 74 may store any number of UI definition files up to a capacity based on the UI to be used.

Also, as illustrated in FIG. 3, each UI definition file 75 includes a plurality of object definition information. Although the UI definition file (2) includes six UI object definition information in FIG. 3, the number of object definition information actually included in the UI definition file (2) corresponds to the number of objects included in the UI configured based on the UI definition file (2).

Each object definition information included in the UI definition file 75, as illustrated in the figure, includes information about various attributes in relation to the object defined by the object definition information. The followings are examples of typical information included in the object definition information:

(1) information about a type of a component (object): information specifying a type of the object, such as whether the object has a function as the button or the key to detect an operation by the user, a function as a text box to display information, or a function simply to display an image on the display unit 30;
(2) resource information used for the object: information defining images and texts for displaying the objects such as the key or the button as the components of the UI displayed on the display unit 30;
(3) position information for arranging the UI object: information specifying positions of the objects in a predetermined UI display area on the display unit 30;
(4) information about a display size of the object: information specifying a size of the object to be displayed in the UI display area of the display unit 30;
(5) information about object operation conditions (action information): information defining an operation of the application when the input to the object is detected (that is, when the contact to the touch sensor 40 is detected at a position corresponding to the object displayed on the display unit 30) (for example, an instruction to disconnect a call when an input event to an object "end" of a mobile phone operation UI is occurred is defined for a mobile phone input operation application); and
(6) information to enable or disable the object: information specifying whether to display the object in the UI display area or whether to activate the object.

According to the present embodiment, as the above (5) information about the object operation conditions (action information), action information for executing a predetermined application function corresponding to each object and information about a predetermined tactile sensation corresponding to each object are defined.

Figure 4:
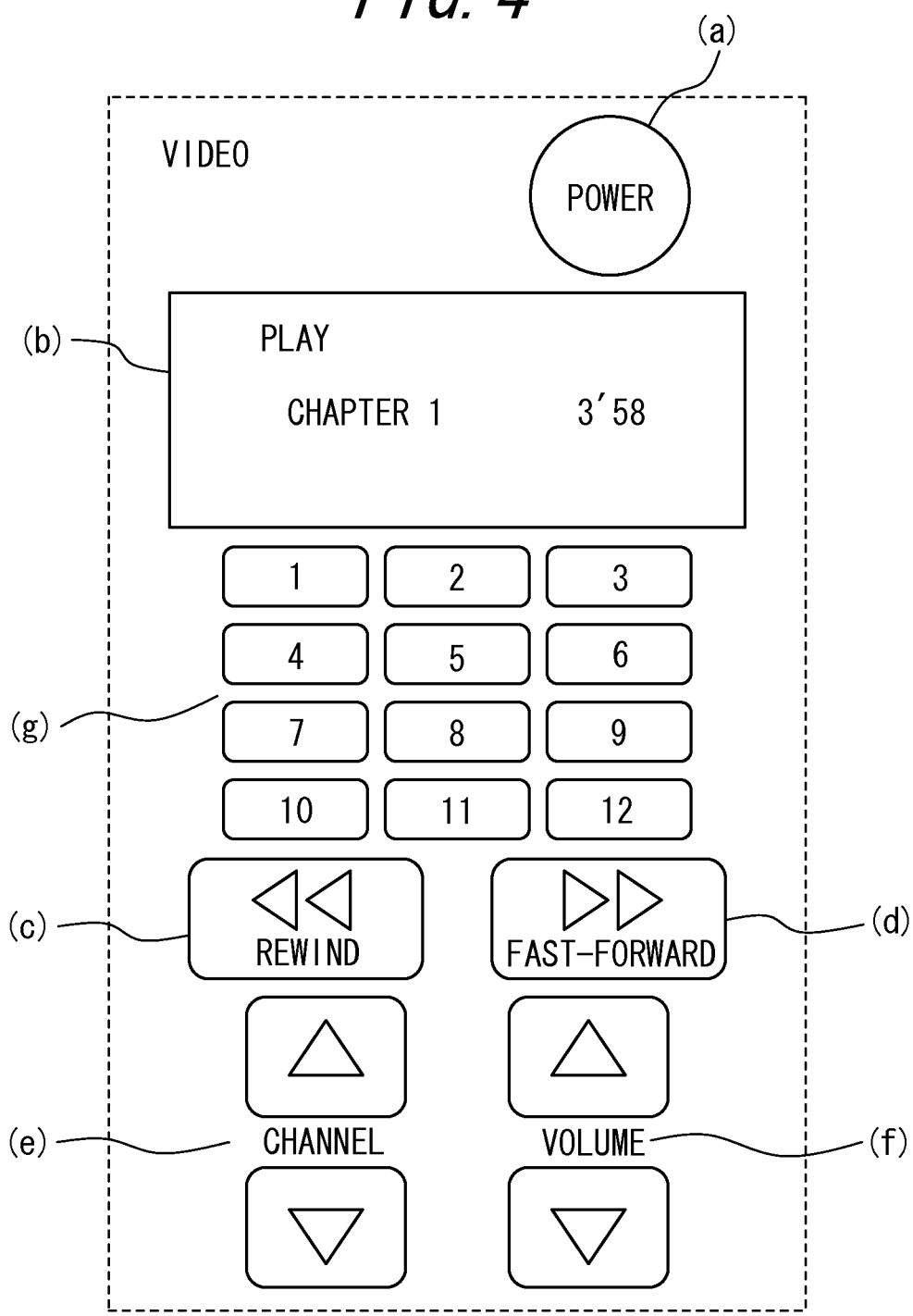
FIG. 4 is a diagram illustrating an example of a user interface displayed on the display unit of the tactile sensation providing apparatus illustrated in FIG. 1.

FIG. 4 to FIG. 6 are diagrams illustrating a concrete example of the information about the object operation conditions described above. With reference to these figures, setting of the tactile sensations by the tactile sensation providing apparatus 1 according to the present embodiment will be described below.

FIG. 4 is a diagram illustrating an example of the UI including objects for performing operations displayed on the display unit 30 when the tactile sensation providing apparatus 1 is used as an input apparatus of a remote controller of a video player. When the tactile sensation providing apparatus 1 is used as the UI of the remote controller of the video player, an application of a remote controller UI of the video player is selected from the applications stored in the application storage area 72 and activated. The operations performed at this time will be described below. Here, an operation to provide the tactile sensation corresponding to each object included in the remote controller UI of the video player illustrated in FIG. 4 will be described.

FIG. 4 is a diagram illustrating an example of the remote controller UI of the video player, which includes:
(a) a power switch object: for turning on or off the video player;
(b) a text box object: for displaying various kinds of information;
(c) a rewind button object: for rewinding a video tape;
(d) a fast-forward button object: for fast-forwarding the video tape;
(e) a channel selection object: for searching channels upward and downward;
(f) a volume control object: for turning the volume up and down; and
(g) a number key object: for inputting numbers and selecting a channel.

As described above, tasks (functions) of the objects included in the UI illustrated in FIG. 4 are set and operations of the functions are preliminarily defined as (5) information about the object operation conditions (action information), as described above. With appropriately defined action information, the remote controller, when an input to (a) power switch object is detected, for example, may transmit a signal to turn on or off the power of the video player, which is an external apparatus, through infrared rays and the like.

FIG. 5 is a diagram illustrating an example of a table of the tactile sensations corresponding to the respective objects included in the UI illustrated in FIG. 4.

In FIG. 5, some of the objects included in the UI illustrated in FIG. 4 are categorized into types and placed in a row in a vertical direction. Such categorization is defined in the UI definition file 75 as (1) information about a type of a component (object). In the example illustrated in FIG. 5, HapButton1 (button 1) is assigned with (a) power button object, and HapButton 2 (button 2) is assigned with (c) rewind button object and (d) fast-forward button object. HapTextBox (text box) is assigned with (b) text box object, and is differentiated depending on whether displaying a text. Although the tactile sensations are set only for the objects (a) to (d) in FIG. 5, the tactile sensations may be set for the above objects (e) to (g) in a similar manner.

The tactile sensation set for each type of the objects is displayed in rows in a horizontal direction in FIG. 5. "h:pressed" (click sensation) represents a type of the click sensation provided when an object of a corresponding type is pressed. "h:released" (release sensation) represents a type of the release sensation provided when a press for an object of a corresponding type is released. "h:slided" (sliding sensation) represents a type of the sliding sensation provided when an object of a corresponding type is pressed and then a sliding input on the object is detected. These types of the tactile sensations are defined as (5) the information about object operation conditions (action information) in the UI definition file. All of these types "h:pressed", "h:released" and "h:slided" are related to the same or similar events of an operation system (OS).

According to the present embodiment, as described above, when the input to the object is detected, instead of simply providing the click sensation, the release sensation or the sliding sensation, different click sensations, release sensation and sliding sensations may be set for each object. Such different tactile sensations may be generated by, when the tactile sensation providing unit 50 is constituted by using a piezoelectric vibrator, for example, adjusting a vibrational frequency or a cycle of the piezoelectric vibrator, output voltage of the piezoelectric vibrator or a pressure load necessary for activating the piezoelectric vibrator.

In FIG. 5, the tactile sensations provided when the input to each of the objects is detected are described in mimetic words as examples. For example, when a pressing operation to the "power button" object of HapButton1 (button 1) is detected, a "jelly-like" click sensation of Type_C1 is provided. Note that "jelly-like" click sensation is a mimetic description of a softer sensation than a "click" sensation. This object also provides the "click" sensation of Type_R1 in the course of release of the pressing input. Further, when the sliding input is detected after detection of the pressing input, this object provides a "rough" sliding sensation of Type_S2.

Also, the object categorized into the HapTextBox (text box), when the pressing input is detected, provides a "beep" click sensation of Type_C3. Since the release sensation is not set for this object, the release sensation is not provided in the course of release of the pressing input. Further, when the sliding input is detected after detection of the pressing input, this object, when displaying the text, provides the "rough" sliding sensation of Type_S2. On the other hand, when the sliding input is detected after detection of the pressing input, this object, when not displaying the text, provides a "sleek" sliding sensation of Type_S1.

FIG. 6 is a diagram illustrating an example describing the tactile sensations set forth above in the XML (UIML) form. In the example in FIG. 6, the tactile sensation is set for (a) the power button object categorized into the HapButton1 (button 1), among the objects described with reference to FIG. 4 and FIG. 5. Under an item "style" in FIG. 6, a shape of the object (a position, a size and used image data) is defined. In the XML (UIML) form for defining the UI described above, an operation performed when the input to the object is detected may be defined under an item "behavior". Here, a definition of the tactile sensation to be provided is added as the operation performed when the input to the object is detected.

At an item (1) in FIG. 6, the object to provide the tactile sensation is declared. Here, (a) the power button object categorized into the HapButton1 (button 1) is specified. At an item (2) in FIG. 6, also, a condition to be satisfied in order to execute a defined operation (here, provision of the tactile sensation) is defined. Here, it is defined that the tactile sensation is provided when the pressure load detected by the load detection unit 60 reaches 1.5 N. At items (3) and (4), further, the tactile sensations provided by the tactile sensation providing unit 50 are defined. In FIG. 6, the "jelly-like" click sensation of the Type_C1 is defined as the click sensation at the item (3) and the "rough" sliding sensation of Type_C2 is defined as the click sensation at the item (4).

As described above, a variety of click sensations, release sensation and sliding sensations may be set for each object. This setting is stored in the UI definition file 75 in the UI definition file storage area 74. That is, the memory unit 70 stores the UI definition file 75 including the information about the tactile sensations corresponding to the respective objects included in the UI to be displayed on the display unit 30, to be provided by the tactile sensation providing unit 50. In changing the UI to be used, by retrieving another UI definition file, an appropriate tactile sensation may be set for each object different in each UI. In such setting, default values for the respective objects may be used.

In defining the tactile sensation to be provided, as described above, the pressure load of the pressing input by the operator may be set as the information about the object operation condition, such that the tactile sensation is provided when the predetermined pressure load is detected. Thereby, the tactile sensation providing apparatus 1 may set various operations based on the pressure by the operator such as, for example, to provide the click sensation when the pressure load satisfying the predetermined standard is detected and then to provide the sliding sensation while the pressure load satisfying the predetermined pressure load is maintained.

Next, an operation of the tactile sensation providing apparatus 1 according to the present embodiment will be described. First, the operation of the tactile sensation providing apparatus 1 to generate the UI and make the UI ready for use by activating a predetermined application will be described.

Figure 7:
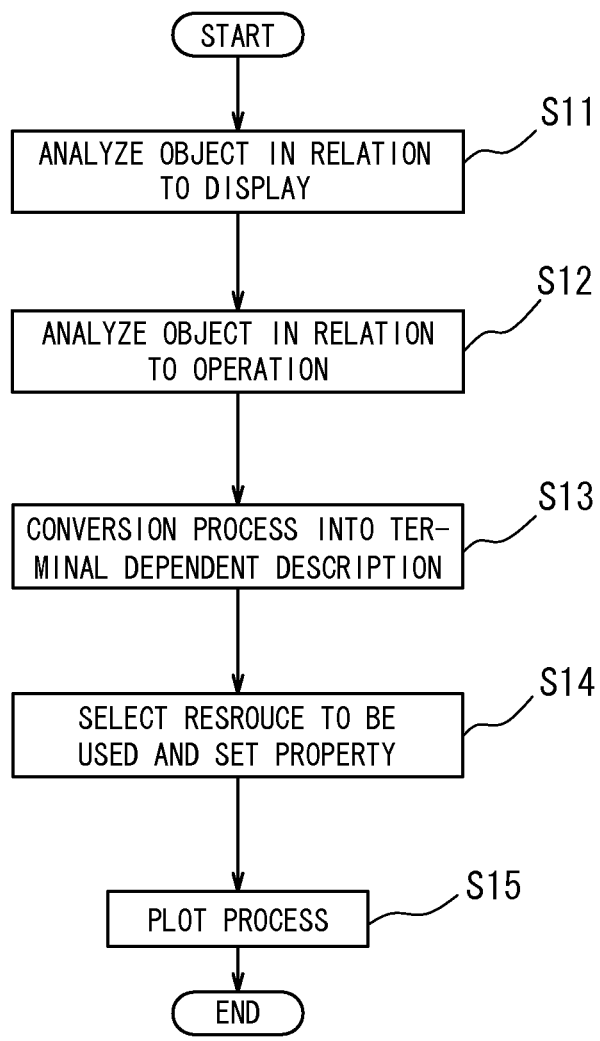
FIG. 7 is a flowchart illustrating an operation to generate the user interface by the tactile sensation providing apparatus illustrated in FIG. 1.

FIG. 7 is a flowchart illustrating the operation of the tactile sensation providing apparatus 1 to generate the UI. Here, the UI generating operation is to analyze the UI definition file 75 and, based on a result of the analysis, to display the UI on the display unit 30.

The UI generating operation illustrated in FIG. 7 starts when the application execution unit 20 retrieves and activates an application stored in the application storage area 72. When the application using the UI is activated, the UI control unit 16 specifies and retrieves the UI definition file 75 used by the application from the UI definition file storage area 74. At this point, the UI based on the specified UI definition file 75 is in the form of one DOM document (or a DOM node). When both of the control unit 10 and the application 20 may access the memory unit 70, the application execution unit 20 supplies the control unit 10 with information for identifying the UI definition file 75. Or, when neither of the control unit 10 nor the application 20 may access the memory unit 70, the application execution unit 20 supplies the control unit 10 with the UI definition file 75, which is then stored in a memory unit (not illustrated) accessible by the control unit 10 to be retrieved.

When the UI generating operation starts, the UI control unit 16 first analyzes the DOM document in relation to the display (step S11). In this analysis, the UI control unit 16 analyzes an attribute with a structure tag or a style tag, for example, in the UI definition file 75 described in the UIML form. Next, the UI control unit 16 analyzes the DOM document in relation to the operations (step S12). In this analysis, the UI control unit 16 analyzes an attribute with a behavior tag in the UI definition file 75 described in the UIML form. According to the present embodiment, at step S12, when the UI includes the object to provide the tactile sensation, the tactile sensation is set for the object.

Next, the UI control unit 16 performs a conversion process of an expression included in the DOM document into a description dependent on each terminal (step S13). Further, the UI control unit 16 selects a resource of the object to be used based on a result of the conversion process at step S13 and sets each attribute (property) (step S14). The resource of the object necessary at this time is retrieved from the UI resource storage area 76. Then, the UI control unit 16 performs a plot process of the UI including each object (step S15). Thereby, the UI generating operation ends and the UI may be displayed on the display unit 30.

Thereby, the tactile sensation providing apparatus 1, along with executing the application that uses the UI, may display the UI on the display unit 30 based on the UI definition file 75. That is, the UI control unit 16 of the tactile sensation providing apparatus 1, by analyzing the UI definition file 75, sets the user interface defined in the UI definition file 75. For example, when the tactile sensation providing apparatus 1 activates the application of the remote controller UI for the video player, the UI illustrated in FIG. 4 is displayed on the display unit 30.

Next, an operation of the tactile sensation providing apparatus 1, after the UI is displayed on the display unit 30, to provide the tactile sensation based on the pressing operation by the operator will be described.

The tactile sensation providing apparatus 1 according to the present embodiment provides the tactile sensation when the pressure load detected by the load detection unit 60 satisfies the predetermined standard load while an operator's contact to the image of the object displayed on the display unit 30 is being detected by the touch sensor 40. In this case, when the pressure load detected by the load detection unit 60 satisfies the predetermined standard load, the tactile sensation is provided based on determination that the operator does not contacted the touch sensor inadvertently (by an erroneous operation or the like) but presses (pushes) intentionally.

Figure 8:
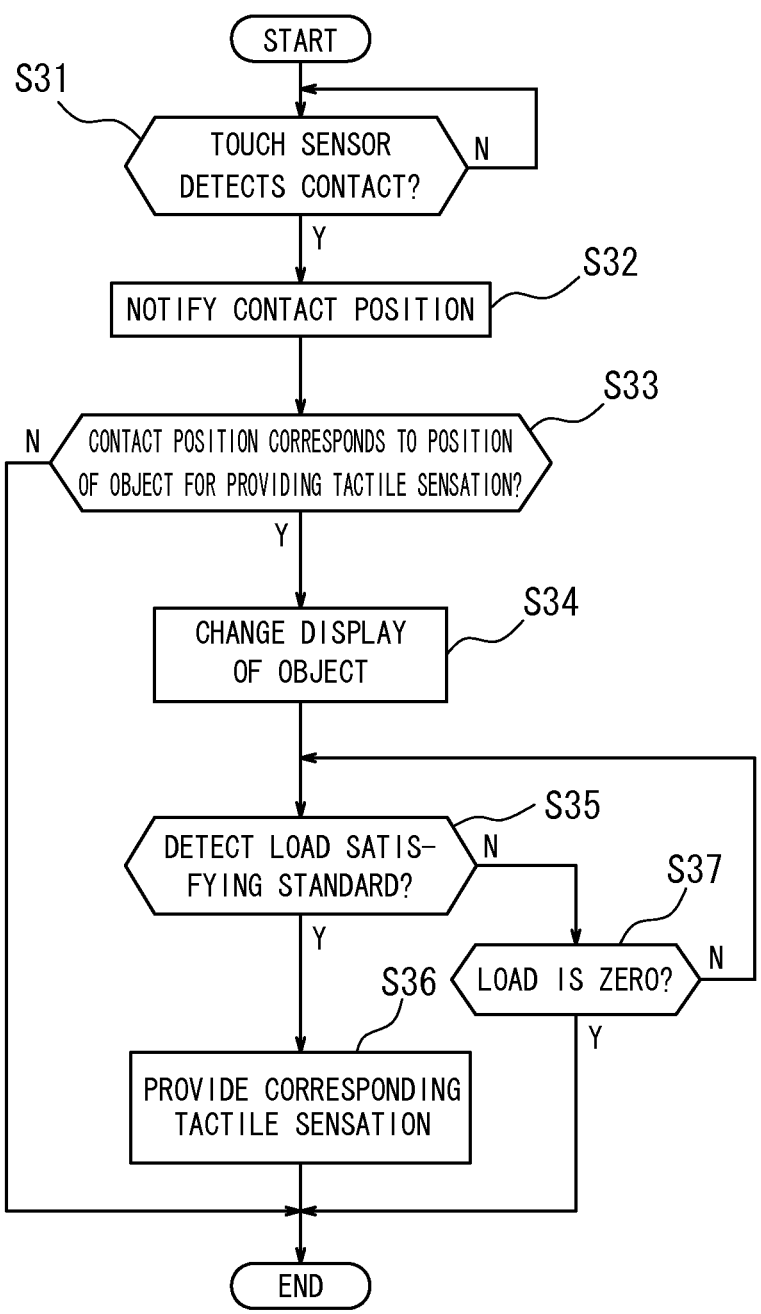
FIG. 8 is a flowchart illustrating an operation to provide a click sensation by the tactile sensation providing apparatus illustrated in FIG. 1.

FIG. 8 is a flowchart illustrating the operation of the tactile sensation providing apparatus 1 according to the present embodiment. When the tactile sensation providing apparatus 1 performs this operation, it is assumed that, by the UI generating operation described above, the display unit 30 preliminarily displays the image of the object such as the key or the like to allow detection of the pressing operation by the operator's finger or the stylus pen. At this time, the application execution unit 20 supplies the display data of the respective objects included in GUI to the display control unit 12 via the UI control unit 16. Then, the display control unit 12, based on the display data of the objects supplied from the application execution unit 20, controls the display unit 30 to display the depicted image the objects. The following is a description of a case that the UI definition file 75 for generating the UI used by the application activated by the tactile sensation providing apparatus 1 defines the tactile sensations for the respective objects, as described above. This application, in order to notify the operator of detection of the contact when the contact to the touch sensor 40 at a position corresponding to the image of the object displayed on the display unit 30 is detected, changes the image of the object in some manner. According to the present embodiment, however, such a change of the image is not essential.

When a preparation described above is completed, the tactile sensation providing apparatus 1 according to the present embodiment starts the operation. When the tactile sensation providing apparatus 1 starts the operation, first, the UI control unit 16 monitors a contact to the touch face of the touch sensor 40 by the operator's finger or the like (step S31). When the contact to the touch face of the touch sensor 40 is detected at step S31, the UI control unit 16 notifies the application execution unit 20 of a contact position (step S32).

Upon being notified of the contact position on the touch sensor 40, the application execution unit 20 determines whether the contact position corresponds to the image of the object such as the key or the like in GUI currently in use (step S33). When the contact position corresponds to the image of the object, the application execution unit 20 supplies the display control unit 12, via the UI control unit 16, with the display data for changing the image of the object in accordance with the setting based on the application. Upon receiving the display data, the display control unit 12 controls the display unit 30 to change the image of the object being displayed (step S34). That is, when the contact to the object such as the key or the like is detected, the tactile sensation providing apparatus 1 changes the image of the object being displayed. In changing the image of the object being displayed, it is preferable to indicate that the object is selected or to change color or brightness of the object, such that the operator may visually confirm the contact (touch) to the key or the like. Such a change in the image of the object may be performed in a variety of manners in accordance with the setting based on the application.

At step S33, since the contact position corresponds to the image of the object, the tactile sensation control unit 14, when the display of the object is changed at step S34 (that is, when the contact to the object such as the key or the like is detected), proceeds to step S35. At step S35, the tactile sensation control unit 14 determines whether the pressure load detected by the load detection unit 60 is increased by a pressure on the touch face of the touch sensor 40 and satisfies the predetermined standard. The load detection unit 60 detects the load from, for example, an average output value of the four strain gauge sensors 51. Here, it is preferable that, based on the pressure load of a usual pressing operation by the operator, the predetermined standard load is preset at, for example, 1.5 N (Newton) and resettable thereafter. In consideration of the pressure load in pressing operation intended by the operator (for example, an average value or the like of the pressure in the pressing operations), the predetermined standard is set avoiding an extremely small value. This is for preventing from regarding an inadvertent light contact by the operator as the pressing (pushing) operation and for providing a realistic tactile sensation described below to the operator.

When the pressure load satisfies the predetermined standard load at step S35, the tactile sensation control unit 14 controls the tactile sensation providing unit 50 to generate a predetermined vibration on the touch face of the touch sensor 40 such that the tactile sensation is provided (step S36). That is, when the pressure load satisfying the standard load for providing the tactile sensation is detected by the load detection unit 60 while the input to the object for executing the predetermined operation is being detected, the tactile sensation control unit 14 controls the tactile sensation providing unit 50 to provide the tactile sensation. Thereby, the tactile sensation providing unit 50 provides the tactile sensation to the pressing object pressing the touch face of the touch sensor 40. The tactile sensation provided at this time, as described with reference to FIG. 5 and FIG. 6, is set based on the information about the object operation conditions (action information) in the UI definition file 75.

According to the present embodiment, the click sensation described above may be provided as the tactile sensation provided to the pressing object by the tactile sensation providing unit 50 at step S36. In order to provide a realistic click sensation to the operator, the tactile sensation providing apparatus 1 stimulates a tactile sensation of the operator while stimulating a pressure sensation. That is, the tactile sensation providing apparatus 1 stimulates the pressure sensation until the pressure load applied to the touch sensor 40 satisfies the standard to provide the tactile sensation (for example, 1.5 N) and, when the pressure load satisfies the standard, stimulates the tactile sensation by driving a piezoelectric element 52 with a predetermined drive signal such that the touch face 40a is vibrated. Thereby, the tactile sensation providing apparatus 1 may provide the operator with the click sensation similar to that obtained when pressing down a button switch such as the push-button switch (push-type button switch). Accordingly, with the object of the graphically depicted push-button switch on the touch sensor, the operator may carry out the input operation feeling the realistic click sensation similar to that obtained when operating an actual push-button switch. Therefore, the operator will not have a feeling of strangeness. Moreover, since the operator may carry out the pressing operation in conjunction with perception to "have pressed" the touch sensor 40, erroneous inputs caused by mere tapping may be prevented.

The drive signal to provide the click sensation described above, that is, a certain frequency, a cycle (wavelength), a waveform and vibration amplitude to stimulate the tactile sensation may be set appropriately according to the click sensation to be provided. For example, in order to provide the click sensation represented by a metal dome switch employed by a mobile terminal, the tactile sensation providing unit 50 is driven by the drive signal, for example, a sine wave with a frequency of 170 Hz, for one cycle. The tactile sensation providing unit 50 is driven with the drive signal described above such that the touch face 40a is vibrated by approximately 15 μm under the pressure load satisfying the predetermined standard load. Thereby, the realistic click sensation similar to that obtained when pressing down an actual key may be provided to the operator.

On the other hand, when the pressure load does not satisfy the predetermined standard load at step S35, the tactile sensation control unit 14 determines whether the pressure load detected by the load detection unit 60 becomes zero as the pressure on the touch face of the touch sensor 40 decreases (step S37). When the pressure load detected by the load detection unit 60 is not zero at step S37, it means that the operator has not canceled (released) the operation to the touch sensor 40. Therefore, the tactile sensation control unit 14 returns to step S35 and continues the operation. On the other hand, when the pressure load detected by the load detection unit 60 is zero at step S37, it may be considered that the operator has canceled (released) the operation to the touch sensor 40. Therefore, the tactile sensation control unit 14 ends the operation illustrated in FIG. 8. At step S37, instead of determining whether the pressure load detected by the load detection unit 60 becomes zero, it is possible to determine whether the contact to the touch sensor 40 is still detected.

At step S33, when the contact position does not correspond to the image of the object, the application execution unit 20 ends the operation illustrated in FIG. 8. That is, when the input to the object such as the key or the like is not detected, or when the input is performed to elsewhere than the object such as the key or the like, the application execution unit 20 ends the operation illustrated in FIG. 8 without changing the display of the object. In this case, further, the UI control unit 16 ends the operation without instructing the tactile sensation control unit 14 to provide the tactile sensation. Accordingly, when the contact to elsewhere than the object such as the key or the like is detected, the tactile sensation providing apparatus 1 does not provide the tactile sensation, thereby the operator may recognize that the input to the object is not detected.

According to the present embodiment, as described above, when the input to the object for executing the predetermined operation is detected and, the pressure load satisfying the predetermined standard load is detected, the tactile sensation defined in the UI definition file 75 is provided. Therefore, when the activated application does not support the operation to provide the tactile sensation, the tactile sensation providing apparatus 1, by using the UI definition file 75 defining the tactile sensations for the respective objects, may provide the tactile sensation appropriately in response to the pressing operation to the object. According to the tactile sensation providing apparatus 1 of the present embodiment, therefore, when the input to the object is detected, the tactile sensation corresponding to the object may be provided and the existing application configuring the UI may be utilized by adding the setting for the UI definition file 75 thereto. According to the tactile sensation providing apparatus 1 of the present embodiment, further, in response to the pressing (pushing) operation to the object such as the key or the like, the realistic click sensation is provided to the operator such that the operator may confirm that the input to the object is appropriately recognized.

The following is a description of an operation to provide the release sensation after providing the click sensation when the pressure load satisfying the standard load is detected while the tactile sensation providing apparatus 1 is detecting the contact by the operator.

In case that pressing operation to the mechanical push-button switch is performed, when the pressure to the switch decreases, a tactile sensation (hereinafter, referred to as the release sensation) of the metal dome switch restoring to its original state is provided. Since the tactile sensation providing apparatus 1 according to the present embodiment may provide the realistic click sensation in response to the pressing operation, it is preferable, in order to provide a sequence of natural operation feelings, that the tactile sensation providing apparatus 1 may provide a realistic release sensation when the pressure on the touch sensor is canceled (released).

Figure 9:
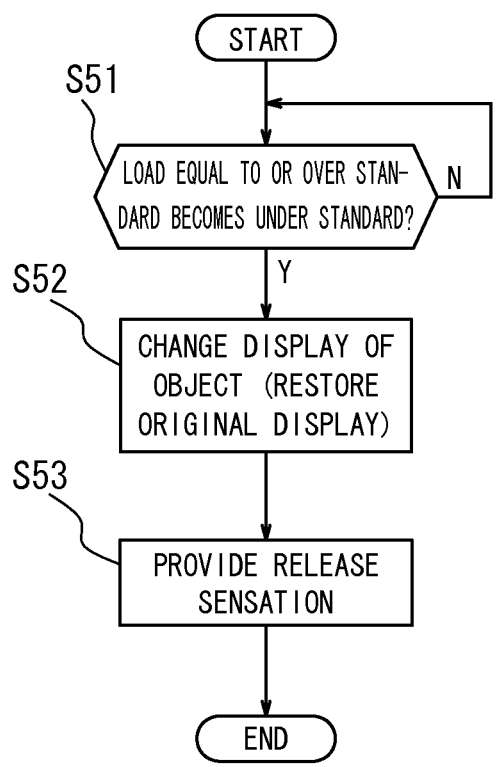
FIG. 9 is a flowchart illustrating an operation to provide a release sensation by the tactile sensation providing apparatus illustrated in FIG. 1.

FIG. 9 is a flowchart illustrating an operation of the tactile sensation providing apparatus 1 according to the present embodiment. The operation illustrated in FIG. 9 starts after the operation to provide the click sensation (step S36) described with reference to FIG. 8. When this operation starts, the tactile sensation control unit 14 determines whether the pressure load of the operation to the touch sensor 40 by the operator decreases and the pressure load detected by the load detection unit 60 equal to or over the predetermined standard load becomes under the predetermined standard load (step S51). Here, "the pressure load equal to or over the predetermined standard load becomes under the predetermined standard load" is a change of the pressure load in release of the pressure from a state exceeding (or equal to) the predetermined standard load to a state falling under (or below) the predetermined standard load.

When it is determined at step S51 that the pressure load equal to or over the predetermined standard load becomes under the predetermined standard load, the application execution unit 20 supplies the display control unit 12, via the UI control unit 16, with the display data for changing the image of the object in accordance with the setting based on the application. Upon receiving the display data, the display control unit 12 controls the display unit 30 to change the image of the object being displayed (step S52). That is, the display control unit 12, when the pressure is released from the object such as the key or the like, changes the image of the object being displayed. In changing the image of the object being displayed, the selected object is restored to an unselected state or color or brightness of the object may be changed, for example, such that the operator may visually confirm that the operation to the key or the like is released.

After change of the display of the object at step S52, the tactile sensation control unit 14 controls the tactile sensation providing unit 50 to provide the release sensation defined in the UI definition file 75 (step S53).

Here, although the standard load for providing the release sensation may be the same as that for providing the click sensation set forth above, it is preferable to set the standard load for providing the release sensation to be as low as 50-80% of the standard load for providing the click sensation in pressing. Thereby, when the same position (object) is continuously pressed (that is, when the keys are repetitively tapped), timings of pressing and releasing the pressure are well synchronized with timings to provide the tactile sensations, thereby providing the realistic click sensation without the feeling of strangeness. That is, setting the standard load for providing the tactile sensation in releasing to be smaller than that in pressing allows the tactile sensation without the feeling of strangeness. In this case, setting the standard load for providing the tactile sensation in releasing to be approximately 50% or more of that in pressing enables a significant improvement in operability in the continuous pressing operation. Also, setting the standard load for providing the tactile sensation in releasing to be approximately 80% or less of that in pressing enables to deal with a faint load change in a holding state in the continuous pressing operation.

Thereby, a more realistic click sensation such as a click sensation "Cli" in pressing and a click sensation "Ck" in releasing may be provided. The same drive signal as that for the click sensation may certainly be used for the release sensation. According to the present embodiment, however, as described with reference to FIG. 5, the release sensation different from the click sensation may be set.

The following is a description of an operation of the tactile sensation providing apparatus 1 when the "sliding sensation" is set for the object in the UI definition file 75.

According to the present embodiment, as the tactile sensation provided by the tactile sensation providing apparatus 1, the sliding sensation described with reference to FIG. 5, for example, may be set for the object in addition to the click sensation and the release sensation described above. For example, for an object in a small size with which the operator is less likely to carry out a sliding operation, setting the click sensation and the release sensation may be sufficient. However, with an object in a large size, the sliding sensation provided on the sliding operation by the operator enables the operator to identify the object without seeing it.

Also, the text box object illustrated in FIG. 5, for example, may be set not to recognize the pressing input by the operator (in this case, preferably, the click sensation and the release sensation are not set). In this case, for example, the "rough" sliding sensation may be provided when the text is displayed in the text box, and a "sleek" sliding sensation may be provided when the text is not displayed in the text box. Thereby, the operator may determine easily and unfailingly whether the text is displayed in the text box, without actually seeing the object. Various applications of setting may be considered such as, for example, to provide a different sliding sensation when a predetermined warning is displayed in the object.

Figure 10:
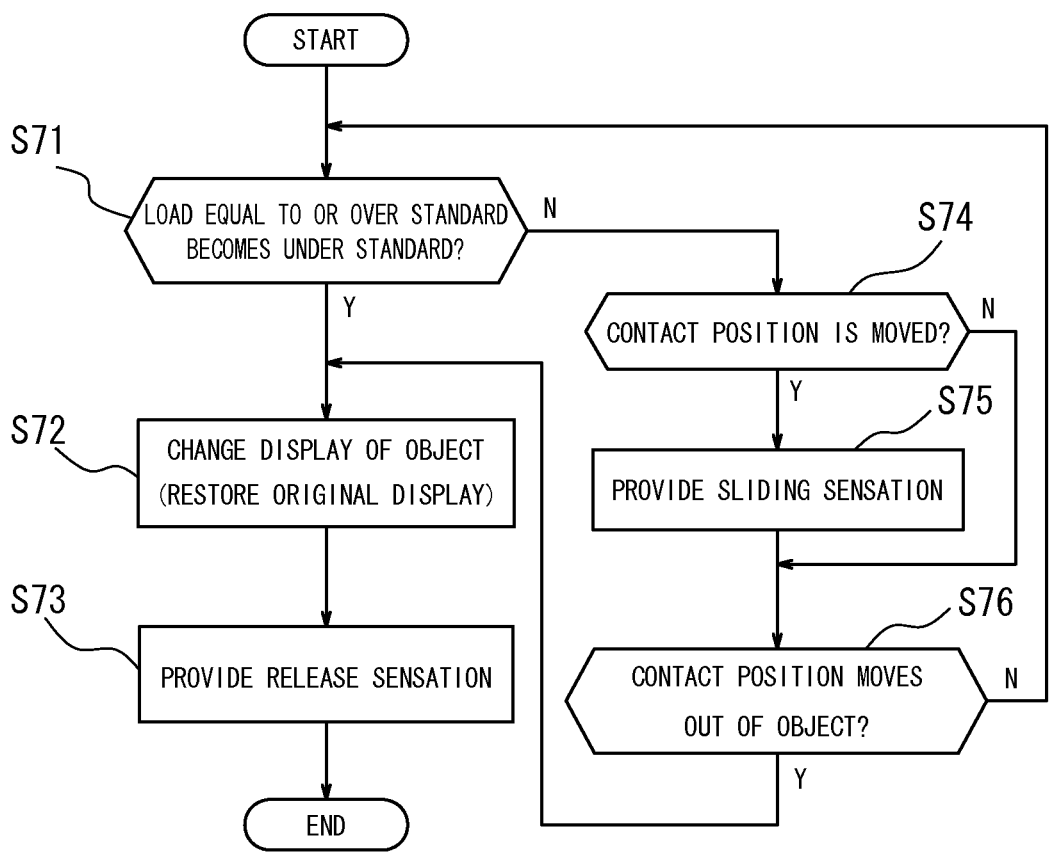
FIG. 10 is a flowchart illustrating an operation to provide a sliding sensation by the tactile sensation providing apparatus illustrated in FIG. 1.
Figure 11:
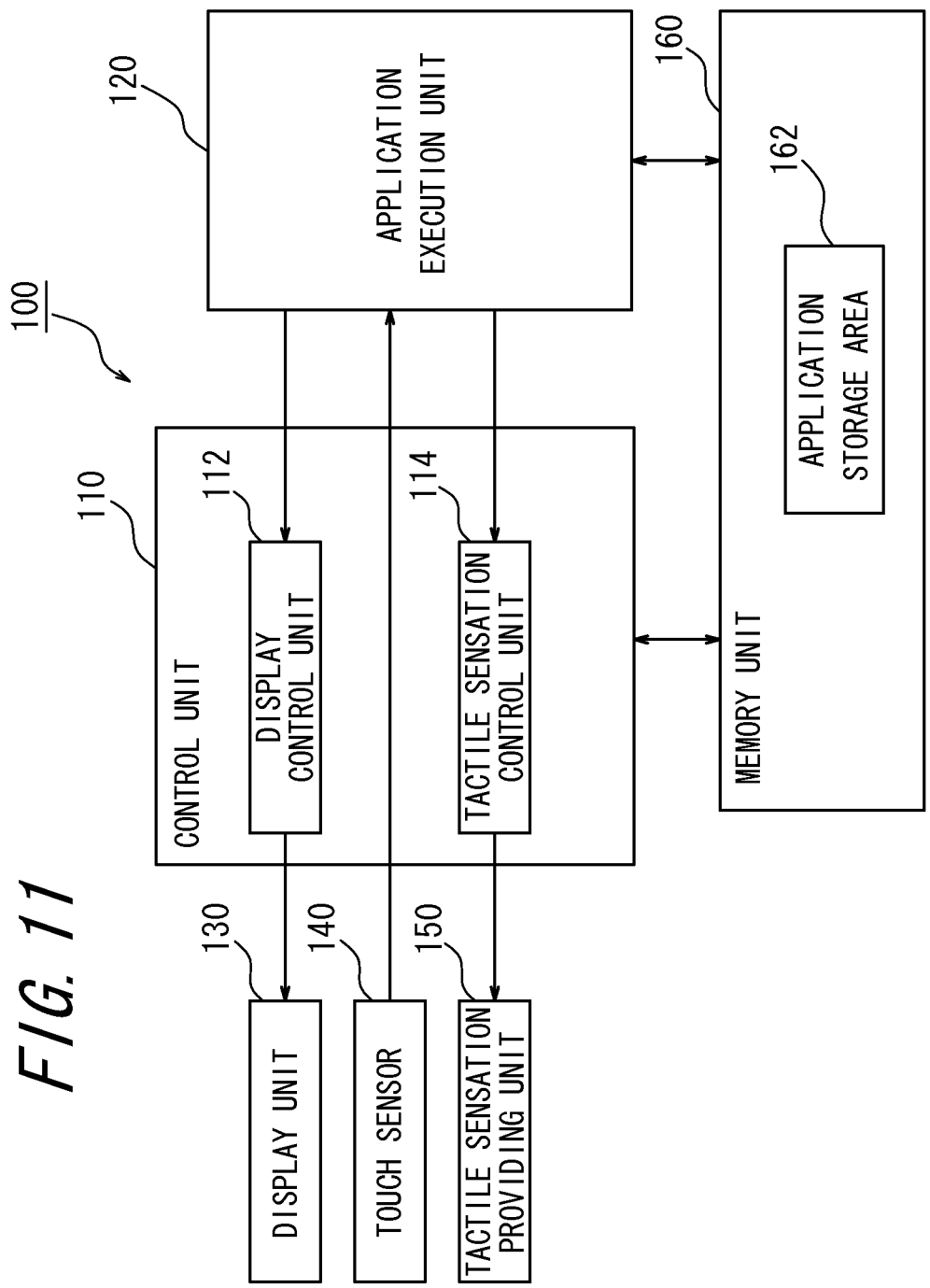
FIG. 11 is a block diagram illustrating a schematic configuration of an assumed tactile sensation providing apparatus.
Figure 12:
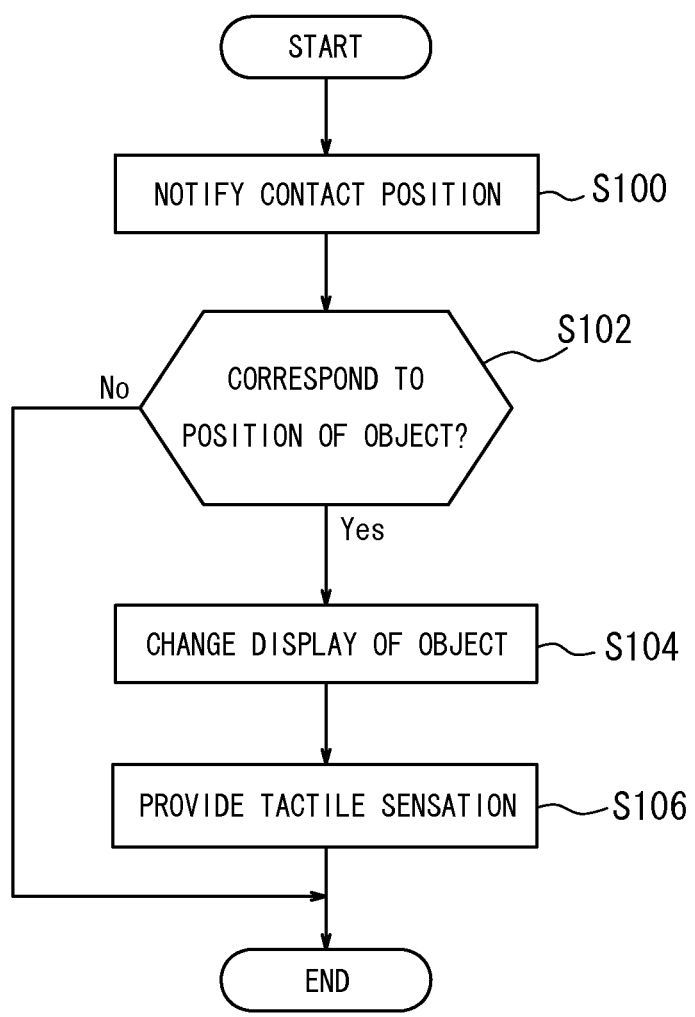
FIG. 12 is a flowchart illustrating an operation of the assumed tactile sensation providing apparatus.

FIG. 10 is a flowchart illustrating an operation to provide the sliding sensation by the tactile sensation providing apparatus 1 according to the present embodiment. In the same manner as the operation to provide the release sensation illustrated in FIG. 9, the operation illustrated in FIG. 10 starts after the operation to provide the click sensation (step S36) described with reference to FIG. 8. In FIG. 10, the processes at step S71 to S73 are similar to those to provide the release sensation described with reference to FIG. 9 (step S51 to S53) and thus descriptions thereof are omitted.

In the operation to provide the sliding sensation, the tactile sensation control unit 14 proceeds to step S74 when the pressure load detected by the load detection unit 60 equal to or over the predetermined standard becomes under the predetermined standard at step S71. At step S74, the UI control unit 16 determines whether the contact position (by pressing) on the touch face of the touch sensor 40 is moved.

When it is determined at step S74 that the contact position is moved, it may be considered that the sliding operation is performed. In this case, the tactile sensation control unit 14 controls the tactile sensation providing unit 50 to generate the predetermined vibration on the touch face of the touch sensor 40 such that the sliding sensation defined in the UI definition file 75 is provided (step S75). On the other hand, when it is determined at step S74 that the contact position is not moved, it may be considered that the sliding operation is not performed and thus the tactile sensation control unit 14 shifts to step S76 skipping the step S75.

At step S76, the application execution unit 20 determines whether the contact position on the touch face of the touch sensor 40 moves out of the image of the object, the input thereto been detected. When it is determined at step S76 that the contact position stays on the object, the tactile sensation control unit 14 returns to step S71 and continues the processes at and after the step. On the other hand, when it is determined at step S76 that the contact position moves out of the object, the tactile sensation control unit 14 returns to step S72 and continues processes performed when release of the contact is detected (step S72 and step S73).

As described above, the tactile sensation providing apparatus 1 according to the present embodiment may set the tactile sensation to be provided in response to the operation for the respective objects in the UI definition file. Thereby, the tactile sensation providing apparatus 1, by utilizing the existing application, may provide an appropriate tactile sensation corresponding to each object under the predetermined condition. According to the present invention, since the UI control unit for controlling UI generation sets the tactile sensation complementing differences between various applications based on the UI definition file 75, the need for considering special controls in application designing is eliminated. Moreover, the tactile sensation providing apparatus 1 according to the present embodiment may provide various tactile sensations including the click sensation and the release sensation in response to the input to the object. Accordingly, the tactile sensation providing apparatus 1 according to the present embodiment may utilize the existing application and provide a realistic operation feeling similar to that obtained when operating the actual push-button switch.

It is to be understood that the present invention is not limited to the above embodiment but may be modified or varied in a multiple of manners. In the above embodiment, for example, the control unit 10 includes the display control unit 12, the tactile sensation control unit 14 and the UI control unit 16. However, the tactile sensation providing apparatus according to the present invention is not limited to such a configuration but may be configured in a variety of manners according to requirements in designing. For example, one function unit may concurrently serve as another function unit so that the latter function unit is omitted, or one function unit may be subdivided into a plurality of function units.

The load detection unit according to the embodiment set forth above may be configured in accordance with a contact detection method employed by the touch sensor. For example, the load detection unit may be constituted without using the strain gauge sensor if the load may be detected from a change in an output signal based on a change in resistance in accordance with a contact area in using the capacitive type. Or, the load detection unit may be constituted without using the strain gauge sensor if the load may be detected from a change in an output signal based on a change in capacitance in using the capacitive type.

The tactile sensation providing unit may be constituted by using any number of piezoelectric vibrators, transparent piezoelectric elements provided on an entire surface of the touch sensor or, if it is possible to vibrate such that the tactile sensation is provided, an eccentric motor which rotates 360 degrees in one cycle of the drive signal. Moreover, the load detection unit and the tactile sensation providing unit may share the piezoelectric elements if both units are constituted by using the piezoelectric elements.

According to the present embodiment set forth above, the touch sensor is placed on the display unit in an overlapping manner. However, the tactile sensation providing apparatus according to the present invention is not limited to such a configuration but the touch sensor and the display unit may be disposed spatially separated from each other.

The present invention may be effectively applied to an input apparatus in which the touch sensor serves as a touch switch for an ON/OFF operation.

Moreover, the tactile sensation providing apparatus according to the present invention drives the piezoelectric element when the pressure load detected based on an output of the piezoelectric element satisfies the standard load for providing the tactile sensation. Here, "when the pressure load detected based on the output of the piezoelectric element satisfies the standard load for providing the tactile sensation" may represent either "when the detected pressure load reaches a standard value for providing the tactile sensation", "when the detected pressure load exceeds the standard value for providing the tactile sensation", or "when the standard value for providing the tactile sensation is detected based on the output of the piezoelectric element".

Further, the "display unit" and the "touch sensor" according to the embodiment set forth above may be constituted by an integrated device, such as a common substrate having functions of them and the like. Such an integrated device having both functions of the display unit and the touch sensor may have a configuration in which, for example, a plurality of photoelectric conversion elements such as photodiodes are orderly mixed in a group of pixel electrodes arranged in a matrix pattern in the liquid crystal panel. This integrated device may display an image in a structure of the liquid crystal panel and also detect a touch position by nearby photoelectric conversion elements that receive backlight of the liquid crystal display reflected by a tip of a pen in contact with a desired position on the face of the panel.

REFERENCE SIGNS LIST 1 tactile sensation providing apparatus
10 control unit
12 display control unit
14 tactile sensation control unit
16 UI control unit
20 application execution unit
30 display unit
40 touch sensor
40a touch face
50 tactile sensation providing unit
52 piezoelectric vibrator
60 load detection unit
61 housing
62 insulator
63 upper cover
64 insulator
70 memory unit
72 application storage area
74 UI definition file storage area
76 UI resource storage area

The invention claimed is:

1. A tactile sensation providing apparatus, comprising:
a user interface definition file storage that stores a plurality of user interface definition files, each user interface definition file including a plurality of objection definition information files that provide, for each object defined by the user interface definition file, information about each of a type, resource, position, display size, and operation condition of the object in addition to one or more tactile sensations corresponding to the object;
application software supporting provision of no tactile sensation and configured, when activated, to supply identification information of a user interface definition file, defining each tactile sensation to at least one user interface object included in a user interface corresponding to the application software, from among the plurality of user interface definition files; and
a control unit configured to retrieve the user interface definition file from the user interface definition file storage based on the identification information supplied from the application software and to set the tactile sensation for the user interface according to the user interface definition file, wherein
a tactile sensation defined to an input event to a first user interface object of the at least one user interface object is different from a tactile sensation defined to the same input event to a second user interface object of the at least one user interface object.

2. A tactile sensation providing apparatus, comprising:
a user interface definition file storage that stores, in a memory unit, a plurality of user interface definition files, each user interface definition file including a plurality of objection definition information files that provide, for each object defined by the user interface definition file, information about each of a type, resource, position, display size, and operation condition of the object in addition to one or more tactile sensations corresponding to the object;
application software supporting provision of no tactile sensation and configured, when activated, to supply a user interface definition file, defining each tactile sensation to at least one user interface object included in a user interface corresponding to the application software, from among the plurality of user interface definition files; and
a control unit configured to store the user interface definition file supplied by the application software in the memory unit and to set the tactile sensation for the user interface according to the user interface definition file retrieved from the memory unit, wherein
a tactile sensation defined to an input event to a first user interface object of the at least one user interface object is different from a tactile sensation defined to the same input event to a second user interface object of the at least one user interface object.

3. A method for providing a tactile sensation, comprising steps of:

storing a plurality of user interface definition files in a user interface definition file storage, each user interface definition file including a plurality of objection definition information files that provide, for each object defined by the user interface definition file, information about each of a type, resource, position, display size, and operation condition of the object in addition to one or more tactile sensations corresponding to the object;

receiving identification information of a user interface definition file defining a tactile sensation from application software, the application software supporting a provision of no tactile sensation and configured, when activated, to supply a user interface definition file defining each tactile sensation to at least one user interface object included in a user interface corresponding to the application software;

retrieving the user interface definition file from the user interface definition file storage based on the identification information; and setting the tactile sensation for a user interface according to the user interface definition file, wherein a tactile sensation defined to an input event to a first user interface object of the at least one user interface object is different from a tactile sensation defined to the same input event to a second user interface object of the at least one user interface object.

4. A method for providing a tactile sensation, comprising steps of:

storing, in a memory unit, a plurality of user interface definition files in a user interface definition file storage, each user interface definition file including a plurality of objection definition information files that provide, for each object defined by the user interface definition file, information about each of a type, resource, position, display size, and operation condition of the object in addition to one or more tactile sensations corresponding to the object;

receiving, from the user interface definition file storage, a user interface definition file, defining a tactile sensation supplied by application software, the application software supporting a provision of no tactile sensation and configured, when activated, to supply a user interface definition file defining each tactile sensation to at least one user interface object included in a user interface corresponding to the application software;

storing the received user interface definition file in the memory unit; and setting the tactile sensation for a user interface according to the user interface definition file retrieved from the memory unit, wherein a tactile sensation defined to an input event to a first user interface object of the at least one user interface object is different from a tactile sensation defined to the same input event to a second user interface object of the at least one user interface object.

\* \* \* \* \*